(12) United States Patent
Beckham et al.

(10) Patent No.: US 10,662,289 B2
(45) Date of Patent: May 26, 2020

(54) POLYMERS FROM BIO-DERIVED DICARBOXYLIC ACIDS

(71) Applicant: Alliance for Sustainable Energy, LLC, Golden, CO (US)

(72) Inventors: Gregg Tyler Beckham, Golden, CO (US); Nicholas Rorrer, Golden, CO (US); Derek Richard Vardon, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 93 days.

(21) Appl. No.: 15/942,703

(22) Filed: Apr. 2, 2018

(65) Prior Publication Data

US 2018/0282481 A1 Oct. 4, 2018

Related U.S. Application Data

(60) Provisional application No. 62/479,776, filed on Mar. 31, 2017.

(51) Int. Cl.
*C08G 69/28* (2006.01)
*C08G 69/26* (2006.01)
*C08G 69/00* (2006.01)

(52) U.S. Cl.
CPC .......... *C08G 69/265* (2013.01); *C08G 69/28* (2013.01)

(58) Field of Classification Search
CPC .................................................. C08G 69/265

USPC .................................................. 528/220, 229
See application file for complete search history.

(56) References Cited

U.S. PATENT DOCUMENTS 9,296,860 B2 3/2016 Friederichs et al.

FOREIGN PATENT DOCUMENTS

WO WO 2015/022119 A1 2/2015

OTHER PUBLICATIONS

Raghunanan et al., "Engineering Green Lubricants II: Thermal Transition and Flow Properties of Vegetable Oil-Derived Diesters", ACS Sustainable Chemistry & Engineering, Feb. 2016, vol. 4, pp. 693-700.

*Primary Examiner* — Duc Truong
(74) *Attorney, Agent, or Firm* — Michael A. McIntyre

(57) ABSTRACT

The present disclosure relates to a polymer that includes a first repeat unit having the structure

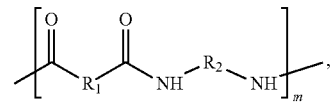

where m is between 1 and 1,000, $R_1$ includes a first organic group, and $R_2$ includes a second organic group.

18 Claims, 6 Drawing Sheets

POLYMERS FROM BIO-DERIVED DICARBOXYLIC ACIDS

CROSS-REFERENCE TO RELATED APPLICATIONS

This application claims the benefit of U.S. Provisional Patent Application No. 62/479,776 filed Mar. 31, 2017, the contents of which are incorporated herein by reference in their entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory.

An aspect of the present disclosure is a polymer that includes a first repeat unit having the structure

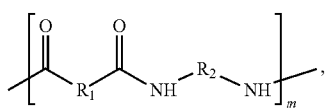

where m is between 1 and 1,000, $R_1$ includes a first organic group, and $R_2$ includes a second organic group.

In some embodiments of the present disclosure, the first repeat unit includes at least one of

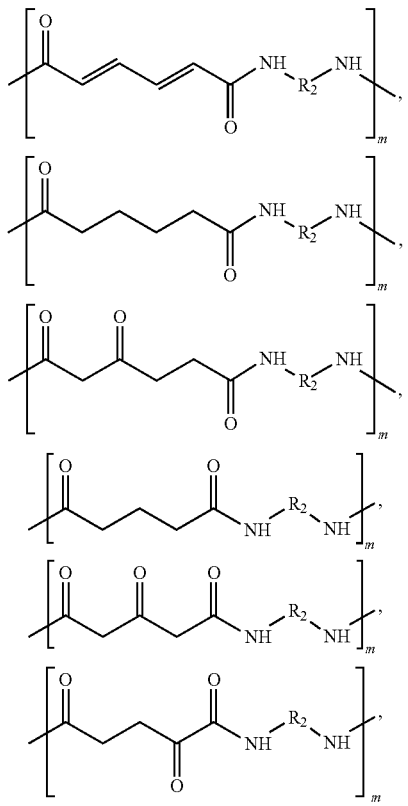

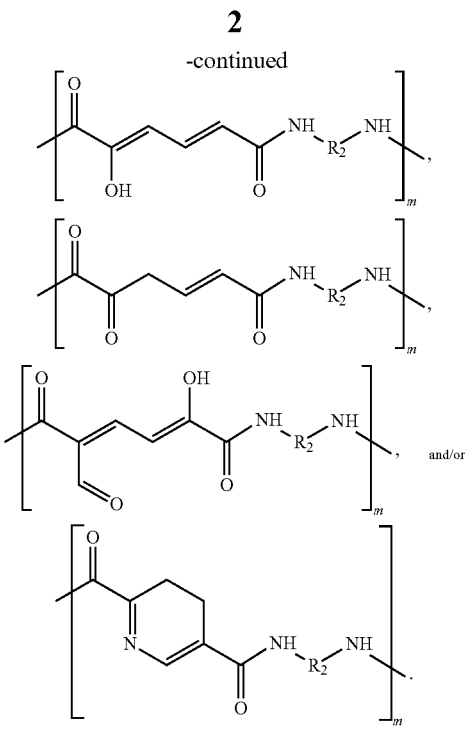

In some embodiments of the present disclosure, the first repeat unit may include at least one of

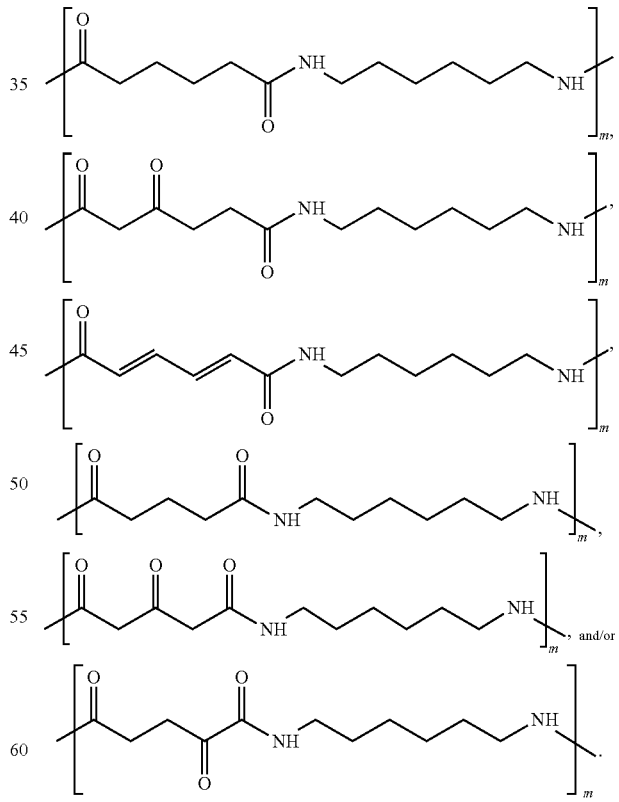

In some embodiments of the present disclosure, the polymer may further include an end-group selected from the group consisting of —O—$R_1$, a hydrogen atom, a halogen atom, and/or a hydroxyl group.

In some embodiments of the present disclosure, the polymer may further include a second repeat unit having the structure

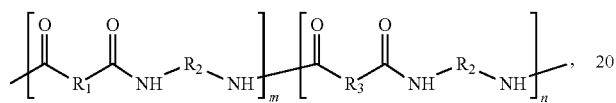

where n is between 1 and 1,000, and $R_3$ comprises a third organic group.

In some embodiments of the present disclosure, the polymer may have the structure of

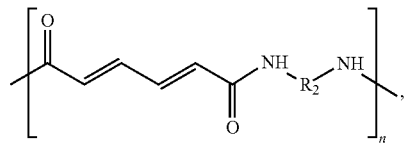

and $R_1$ may be different than $R_3$.

In some embodiments of the present disclosure, the second repeat unit may include at least one of

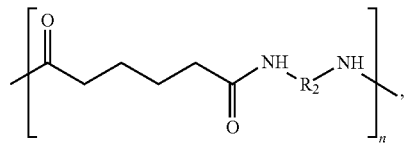

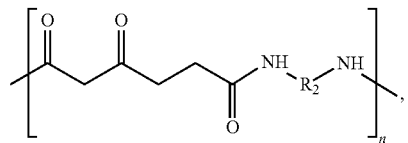

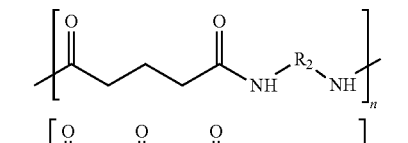

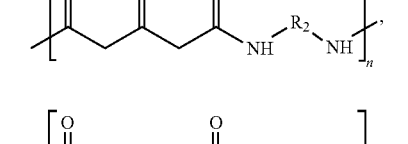

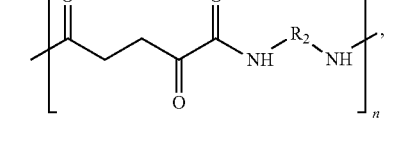

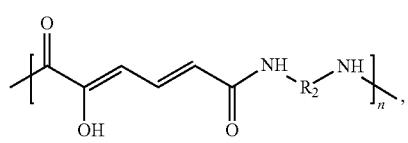

-continued

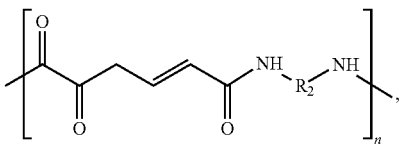

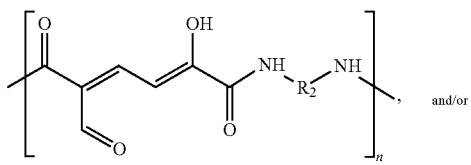

, and/or

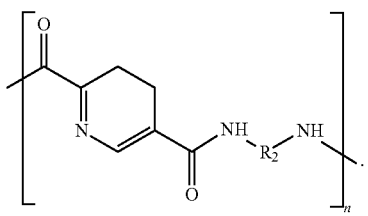

.

In some embodiments of the present disclosure, the second repeat unit may include at least one of

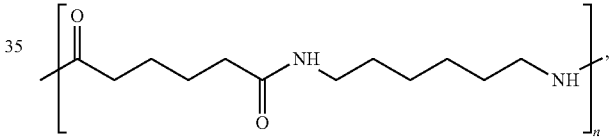

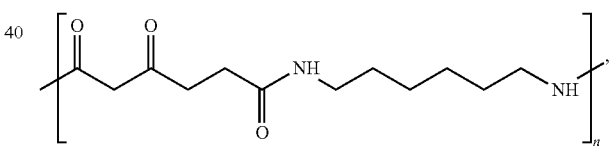

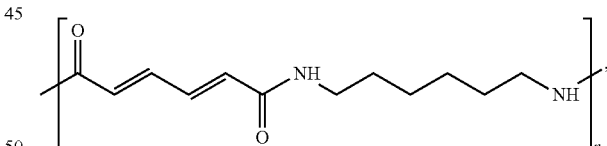

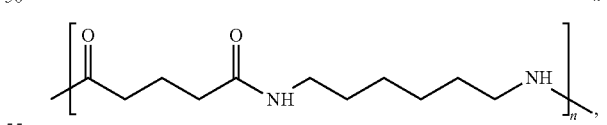

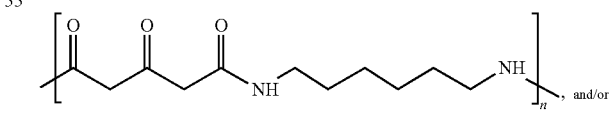

, and/or

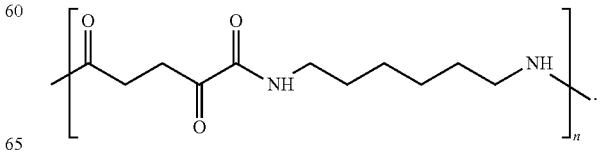

.

In some embodiments of the present disclosure, the polymer may include at least one of

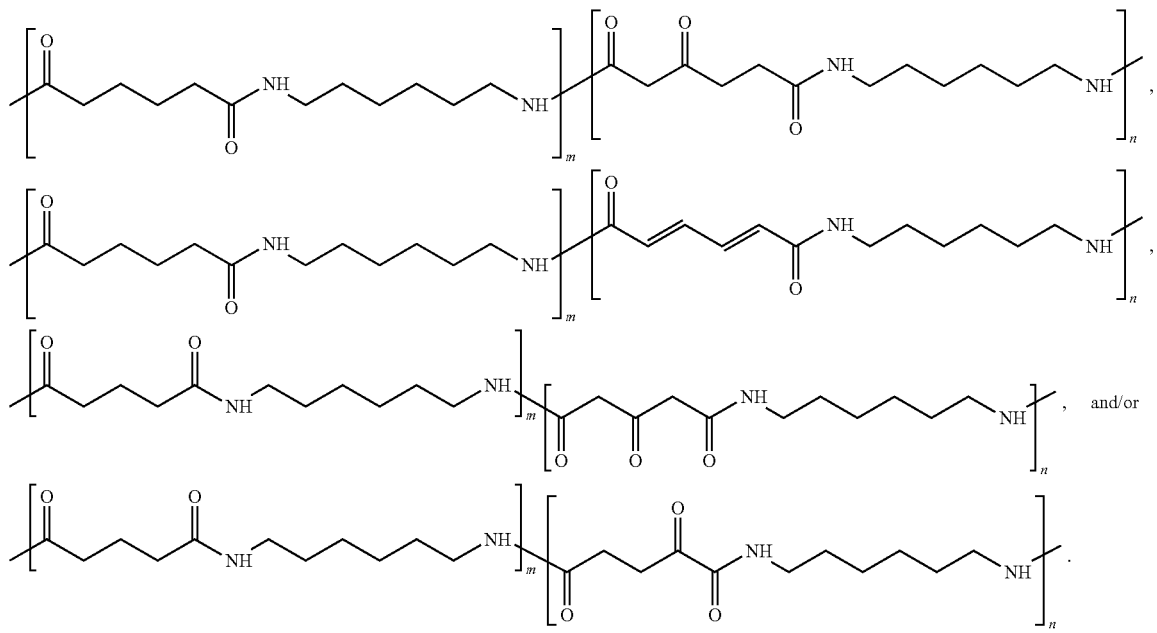

In some embodiments of the present disclosure, $R_2$ of the first repeat unit may be different than $R_2$ of the second repeat unit.

An aspect of the present disclosure is a method that includes polymerizing a diamine with a first reactant having the structure

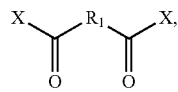

where $R_1$ includes a first organic, X includes at least one of —O—$R_4$, a hydroxyl group, or a halogen, $R_4$ includes at least one of an alkane group, an alkene group, or an alkyne group, the polymerizing results in a polymer having a first repeat unit with the structure

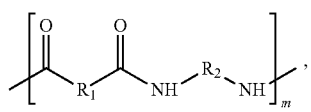

and m is between 1 and 1,000.

In some embodiments of the present disclosure, X may include a hydroxyl group, and the polymerizing may produce water. In some embodiments of the present disclosure, X may include —O—$R_4$, $R_4$ may include an alkane, and the polymerizing may produce an alcohol. In some embodiments of the present disclosure, the method may further include, prior to the polymerizing, reacting a first carboxylic acid with the alcohol to produce the first reactant and water. In some embodiments of the present disclosure, X may include chloride, and the polymerizing may produce HCl. In some embodiments of the present disclosure, the method may further include, prior to the polymerizing, reacting a first carboxylic acid with phosphorous oxychloride to produce the first reactant. In some embodiments of the present disclosure, the polymerizing may further include a second reactant having the structure

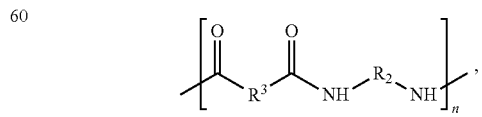

where $R_3$ includes a second organic, X' includes at least one of —O—$R_5$, a hydroxyl group, or a halogen, $R_5$ includes at least one of an alkane group, an alkene group, and/or an alkyne group, the polymerizing results in a polymer having a second repeat unit with the structure and n is between 1 and 1,000.

In some embodiments of the present disclosure, the polymerizing may produce a polymer having the structure

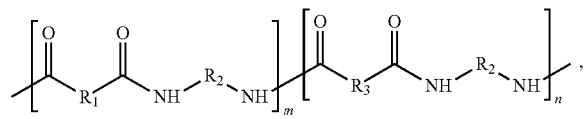

and $R_1$ is different than $R_3$.

REFERENCE NUMBERS

Figure 1:
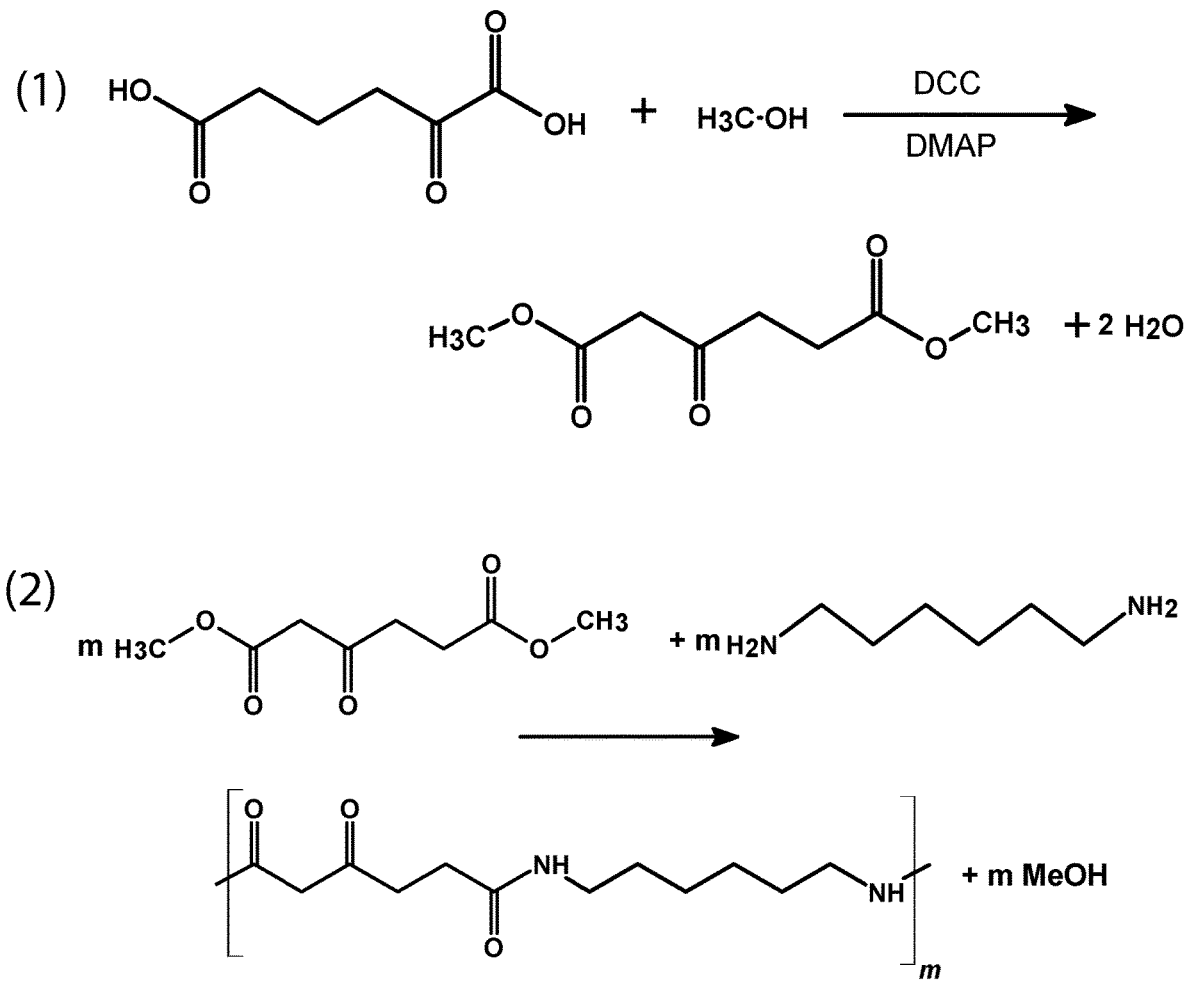
FIG. 1 illustrates an example of a specific reaction scheme for producing polymers using bio-derived dicarboxylic acids, according to some embodiments of the present disclosure.

| | |
|---|---|
| 100 | dicarboxylic acid |
| 110 | alcohol |
| 120 | diester |
| 130 | water |
| 140 | diamine |
| 150 | polymer |
| 200 | method |
| 205 | fermentation broth |
| 210 | pre-treating |
| 220 | first reacting |
| 230 | second reacting |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The present disclosure relates to reaction routes, methods, and systems for the production of unique polymers produced using, among other things, bio-derived dicarboxylic acids. In some embodiments of the present disclosure, at least one dicarboxylic acid and at least one diamine may be reacted in one or more reaction steps to produce polymers, including homopolymers and/or copolymers. For example, as described herein, a nylon-like polymer was synthesized from biologically produced β-keto adipic acid and hexamethylene diamine. The resultant nylon-like polymer has favorable thermal properties compared to Nylon 6,6 due at least to the presence of at least one ketone functionality in the polymer's backbone.

In general, the present disclosure relates to methods for producing unique polymers having a single repeat unit, such that the polymer is defined by the general structure

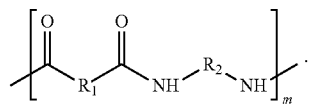

m may very between 1 and 1,000 and represents the number of repeat units connected in series to produce the polymer. In some embodiments of the present disclosure, m may be greater than 1,000. As used herein, a polymer having one repeat unit is referred to as a homopolymer. $R_1$ may include at least one of a straight chained organic and/or a branched organic, where the organic may be saturated or unsaturated. Thus, in some embodiments of the present disclosure, $R_1$ may include at least one functional group, including at least one of an alkane, an alkene, an alkyne and/or an aromatic, either in the form of a straight chain and/or a branched chain. In some embodiments of the present disclosure, $R_1$ may include at least one functional group, including at least one of an ether, an amine, an aldehyde, a ketone, an alcohol, a halogen, a carboxylic acid, an ester, an amide, a silane, pyridine, and/or a furan. $R_1$ may include other elements, in addition to carbon, hydrogen, and oxygen, including at least one element such as nitrogen, sulfur, phosphorous, silicon, and/or a halogen. As described herein, $R_1$ may be provided by a dicarboxylic acid that is bio-sourced and/or provided by some other source. Similarly, $R_2$ may include at least one of a straight chained and/or branched organic, where the organic may be saturated or unsaturated. Thus, in some embodiments of the present disclosure, $R_2$ may include at least one functional group, including at least one of an alkane, an alkene, and/or an alkyne, either in the form of a straight chain and/or a branched chain, and/or an aromatic. In some embodiments of the present disclosure, $R_2$ may include at least one functional group, including at least one of an ether, an amine, an aldehyde, a ketone, an alcohol, a halogen, a carboxylic acid, an ester, an amide, a silane, pyridine, and/or a furan. $R_2$ may include other elements, in addition to carbon, hydrogen, and oxygen, including at least one element such as nitrogen, sulfur, phosphorous, silicon, and/or a halogen. As described herein, $R_2$ may be provided by a diamine that is bio-sourced and/or provided by some other source. As used herein, the term "bio-sourced" refers to a compound that is derived from biomass, for example by the deconstruction of a material containing at least one of lignin, cellulose, and/or hemicellulose.

As described herein, some embodiments of the present disclosure relate to methods for producing unique copolymers having at least a first repeat unit and a second repeat unit, where the copolymer is defined by the general structure

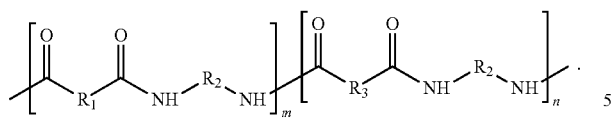

m may very between 1 and 1,000 and represents the number of repeat units of the first repeat unit containing both $R_1$ and $R_2$ as described above, and n may very between 1 and 1,000 and represents the number of repeat units of the second repeat unit containing both $R_2$ (as described above) and $R_3$. In some embodiments of the present disclosure, at least one of m and/or n may be larger than 1,000. $R_3$ may include at least one of a straight chained organic and/or a branched organic, where the organic may be saturated or unsaturated. Thus, in some embodiments of the present disclosure, $R_3$ may include at least one functional group, including at least one of an alkane, an alkene, and/or an alkyne, either in the form of a straight chain and/or a branched chain, and/or an aromatic. In some embodiments of the present disclosure, $R_3$ may include at least one functional group, including at least one of an ether, an amine, an aldehyde, a ketone, an alcohol, a halogen, a carboxylic acid, an ester, an amide, a silane, pyridine, and/or a furan. $R_3$ may include other elements, in addition to carbon, hydrogen, and oxygen, including at least one element such as nitrogen, sulfur, phosphorous, silicon, and/or a halogen. As described herein, $R_3$ may be provided by a second dicarboxylic acid that is bio-sourced and/or provided by some other source, where $R_3$ is different than $R_1$.

Although the example above shows two repeat units, both including $R_2$ corresponding to the same diamine source molecule, the use of more than only diamine source molecule falls within the scope of the present disclosure. Similarly, polymers containing more than two repeat units fall within the scope of the present disclosure. Polymer endgroups, for either homopolymers, copolymers, and/or mixed polymers may include at least one of an $R_4$ group, a hydrogen atom, a hydroxyl group, and/or a halogen such as a chloride atom.

Examples of polymers that fall within the scope of the present disclosure include polymers that include as source molecules for at least one repeat unit at least one diamine reacted with at least one of muconic acid, adipic acid, β-keto adipic acid, glutaric acid, β-glutaric acid, α-glutaric acid, (2Z,4E)-2-hydroxyhexa-2,4-dienedioic acid, (3E)-2-oxo-hex-3-enedioic acid, and/or (2E,4E)-2-formyl-5-hydroxy-hexa-2,4-dienedioic acid. Thus, some embodiments of the present disclosure include polymers that include at least one of the following repeat units, respectively:

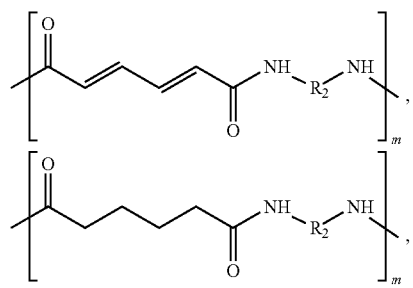

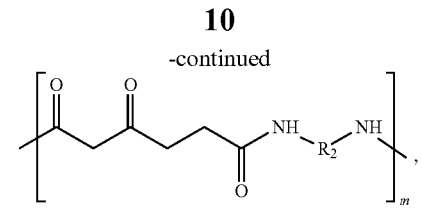

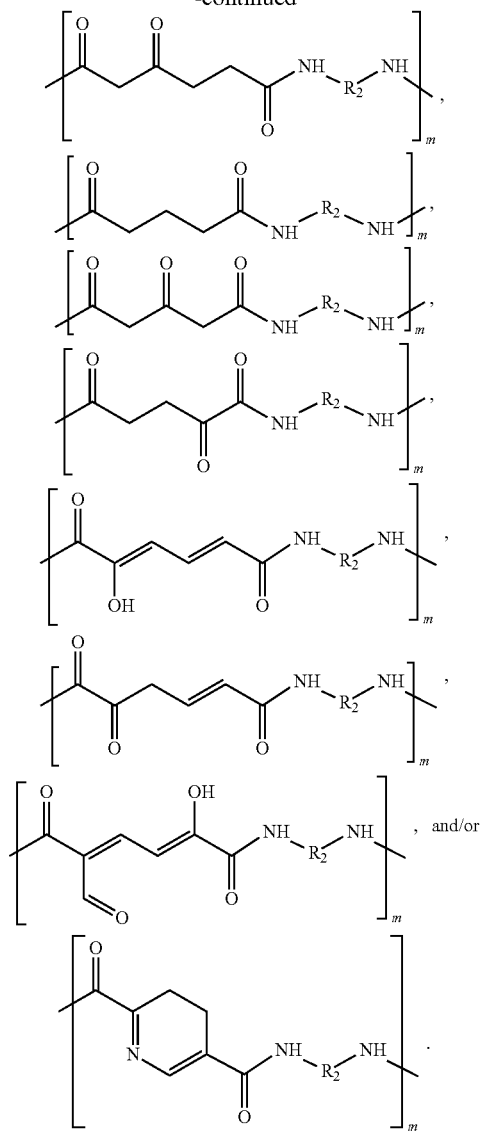

Thus, referring to the structures above, any one of these repeat units may be used to construct a corresponding homopolymer, or two of the repeat units may be combined to construct a corresponding copolymer, or three or more of the repeat units may be combined to construct a corresponding mixed polymer. As described herein, specific examples of homopolymers produced according to some embodiments of the present disclosure, using hexamethyl diamine as the diamine, reacted with dicarboxylic acids, or forms thereof (as described below), include adipic acid, β-keto adipic acid, muconic acid, glutaric acid, β-glutaric acid, and α-glutaric acid, with the corresponding homopolymer structures as follows:

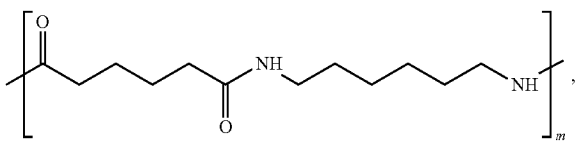

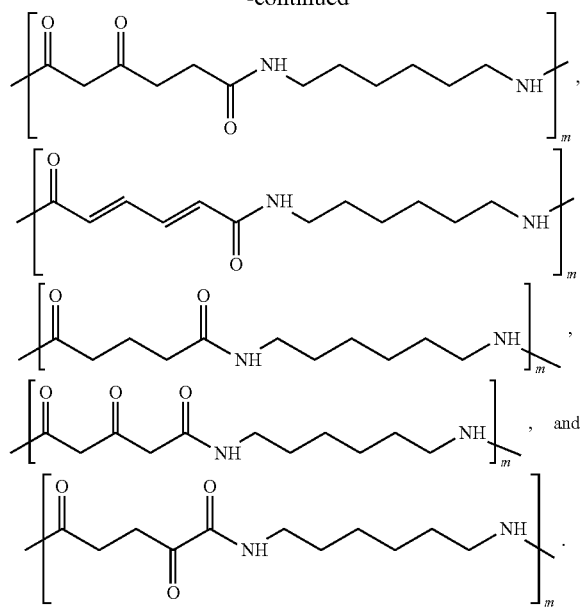

As described herein, specific examples of copolymers produced according to some embodiments of the present disclosure, using hexamethyl diamine as the diamine, reacted with dicarboxylic acid pairs, or forms thereof (as described below), include adipic acid and β-keto adipic acid, adipic acid and muconic acid, glutaric acid and β-glutaric acid, and glutaric acid and α-glutaric acid, with the corresponding copolymer structures as follows:

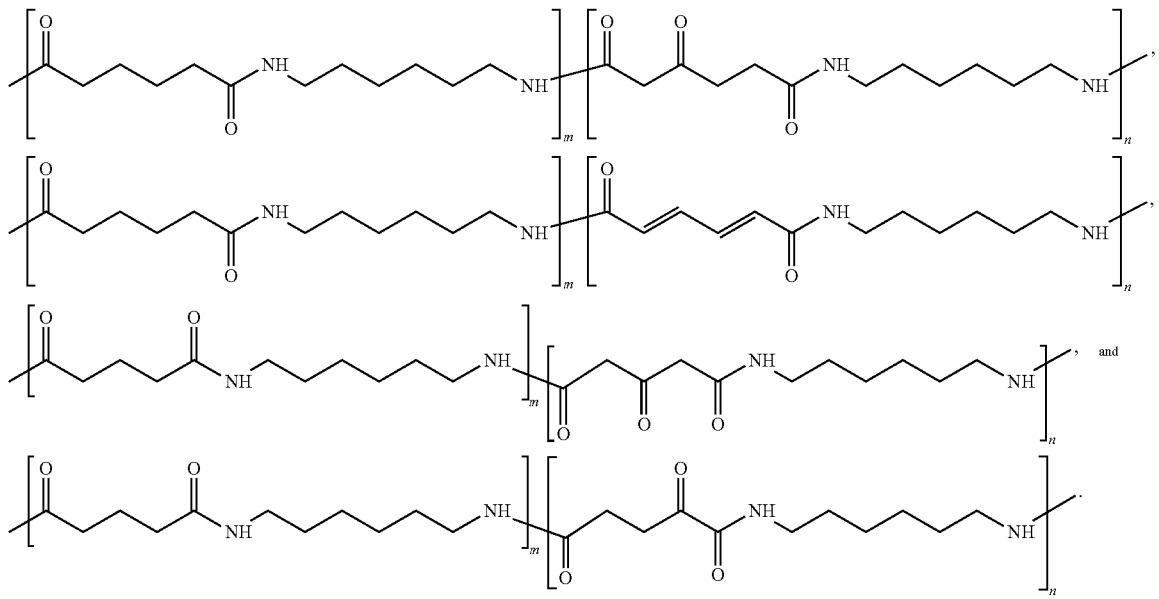

All four of these example copolymers were produced with end-groups including hydrogen atoms and methyl groups, hydrogen atoms and hydroxyl groups, or hydrogen atoms and chloride atoms, for a total eight different copolymer examples.

The three different end-group combinations correspond to three different reaction routes for producing the homopolymers, copolymers, and/or mixed polymers described herein. Reactions (1) and (2) below illustrate the reactions for a first route (Route #1: esterification/polymerization) to produce at least some of the polymers described herein, according to some embodiments of the present disclosure.

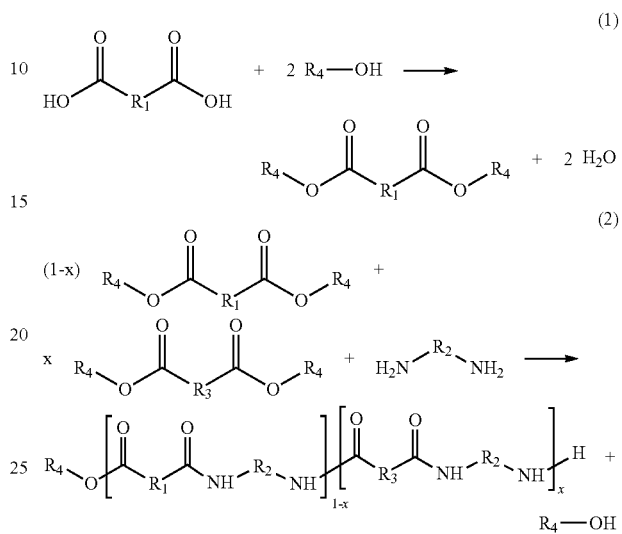

Reaction (1) illustrates an esterification reaction, where a dicarboxylic acid, e.g. a bio-derived dicarboxylic acid such as muconic acid, is converted to a diester by reacting the dicarboxylic acid with an alcohol producing water as a by-product. Suitable alcohols may include at least one primary, secondary, and/or tertiary alcohol with examples including methanol, ethanol, propanol, butanol, etc. In other words, an alcohol used in Reaction (1) may be any desired functional group $R_4$ attached to a hydroxyl group. In some embodiments of the present disclosure, Reaction (1) may be completed as a Steiglich esterification. Referring to m and n used above, x of Reaction (2) may be represented as x=n/(m+n) where 0≤x≤1.0. In this case of Steiglich esterification, dicyclohexylcarboiimide (DCC) was added into a reactor alongside the diacid of interest at a mol ration of 2.1:1 respectively with an excess of alcohol, in this case methanol. 4-N-N'-dimethylaminopyridine (DMAP) may be used as a catalyst. The reaction was conducted in dichlormethane over-night in a chilled ice bath to reach 100% complementation. The dicyclohexylurea (the undesirable product of this reaction) precipitated from solution and was removed via filtration. Excess solvent was removed by distillation (e.g. rotovap). However, this reaction may be conducted in any aprotic solvent above the melting point of the solvent, and below its boiling point, for a period of time between 2 minutes and 24 hours. In general, a majority of the product or synthesized in less than five minutes, but longer reaction times result in better yields and/or conversion.

Reaction (2) illustrates a second step for the first route, reacting at least one diester (Reaction (2) shows two diesters contributing $R_1$ and $R_3$ functional groups, respectively) with a diamine containing $R_2$ to produce a polymer (e.g. homopolymer, copolymer, and/or mixed polymer) where the alcohol is regenerated as a by-product. In some embodiments of the present disclosure, the alcohol may be removed as it is produced to shift Reaction (2) to the right by Le Chatelier's principle. Typically, this is a bulk reaction conducted above the melting temperature of the reactants, but below their boiling temperatures. After an initial pre-polymerization phase, the temperature can be increased as high as the degradation point of the polymer (~350 C). The polymerizing may also be conducted in cresol or hexafloruoisopropanol (a strong polar solvent that will not react with the amine).

A second route (Route #2: condensation/polymerization) to synthesize the polymers described herein may be achieved by the direct condensation of dicarboxylic acids, as shown in Reaction (3) below:

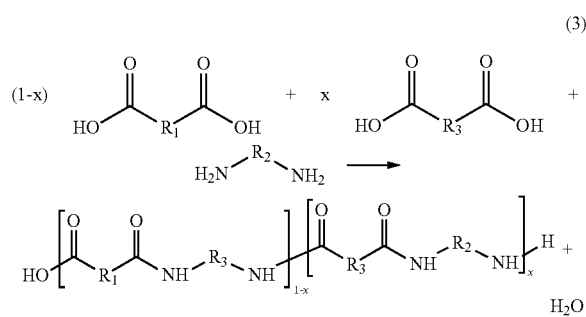

Reaction (3) results in the production of water as a by-product. Reaction (3) also results in hydroxyl group and hydrogen atom end-groups. Referring to m and n used above, x of Reaction (3) may be represented as x=n/(m+n) where 0≤x≤1.0. Typically, this is a bulk reaction conducted above the melting temperature of the reactants, but below their boiling temperatures. After an initial pre-polymerization phase, the polymerization temperature can be increased as high as the degradation point of the polymer (~350 C). The polymerization may also be conducted in cresol or hexafloruoisopropanol (a strong polar solvent that will not react with the amine).

A third route (Route #3: acylation/polymerization) to synthesize the polymers described herein may be achieved by another two-step process that beings with the conversion of at least one dicarboxylic acid to an acyl chloride (Reaction (4)) followed by the reacting the acyl chloride with a diamine to make polymers (e.g. homopolymers, copolymers, and/or mixed polymers) as described herein (Reaction (5)):

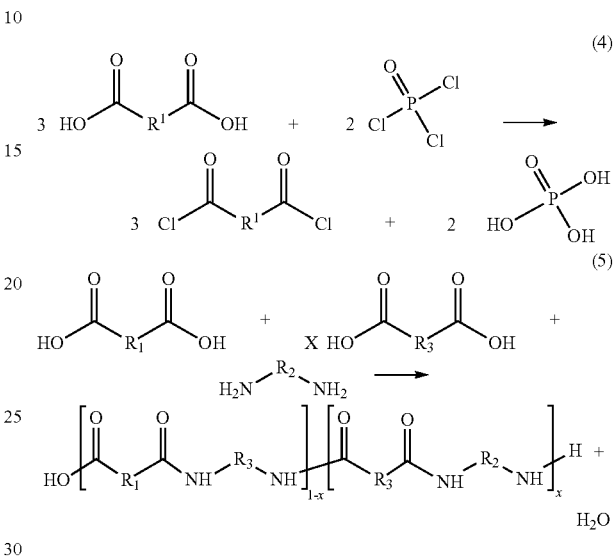

Referring to m and n used above, x of Reaction (5) may be represented as x=n/(m+n) where 0≤x≤1.0. As shown in Reaction (4), a dicarboxylic acid may be reacted with phosphorous oxychloride whereby the hydroxyl groups of the dicarboxylic acid are exchanged with chloride. This polymerization may be conducted in any aprotic solvent, provided the reactants are soluble. The polymerization temperature should be above the melting point of the solvent, and below its boiling point, for a period of time between 2 minutes and 24 hours. In general, a majority of the polymer products are synthesized in less than five minutes, however, longer reaction times result in higher conversions and/or improved yields. Dimethylformamide may be used as a catalyst.

As shown in Reaction (5), one or acyl chlorides may then be reacted with at least one diamine, resulting in the synthesis of polymers (e.g. homopolymers, copolymers, and or mixed polymers) as described herein, and HCl as a by-product. Typically, this is a bulk reaction conducted above the melting temperature of the reactants, but below their boiling temperatures. After an initial pre-polymerization phase, the polymerization temperature can be increased as high as the degradation point of the polymer (~350 C). The polymerization may also be conducted in cresol or hexafloruoisopropanol (a strong polar solvent that will not react with the amine). Triethyl amine and/or any other suitable base may be used as catalysts.

FIG. 1 illustrates an embodiment of the first route to producing a homopolymer, as described above and summarized in Reactions (1) and (2). Reaction (1) of FIG. 1 shows a dicarboxylic acid 100 (β-keto adipic acid) reacting with an alcohol 110 (methanol) in the presence of dicyclohexylcarbodimide (DCC) and 4-N,N'-dimethylaminopyridine (DMAP) a catalyst to produce a diester 120 (hexanedioic acid) and water 130. In this example, the water 130 produced is not produced as free water. Instead, the water 130 is incorporated into the DCC. In the next step, Reaction (2) of FIG. 1, the diester 120 (hexanedioic acid) is reacted with a diamine 140 (hexamethylenediamine) to produce the target polymer 150 (a Nylon-like polymer).

Figure 2:
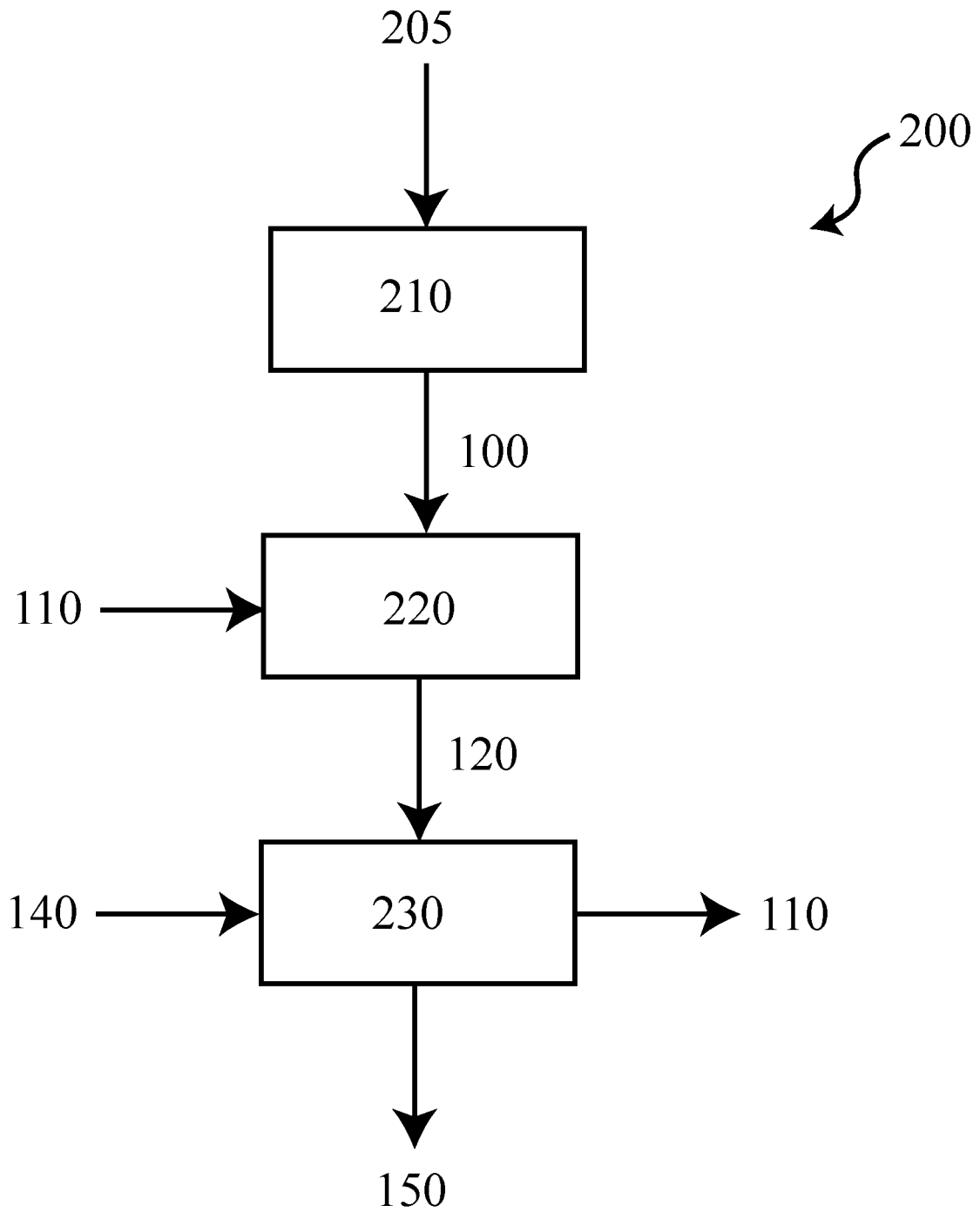
FIG. 2 illustrates a method for synthesizing polymers using bio-derived dicarboxylic acids, according to some embodiments of the present disclosure.

FIG. 2 illustrates a method 200 (or system) for producing a polymer 150 from a bio-derived dicarboxylic acid 100 obtained from a biomass source, for example from a fermentation broth 205. The method 200 may begin by directing the fermentation broth 305 to unit operating for pre-treating 210 the fermentation broth 205. Examples of pre-treating 210 may include separating (e.g. filtering, centrifuging, extracting, crystallizing, distilling, evaporating, etc.), heating, cooling, pH-adjusting, and/or any other suitable operating. At least one result of the pre-treating 210 is the generation of a stream sufficiently pure in the dicarboxylic acid 100 to allow the reactions summarized in FIGS. 1 and 2 to proceed with acceptable levels of yield and selectivity. The dicarboxylic acid 100 resulting from the pre-treating 210 may then be directed a reactor for a first reacting 220 step as summarized in Reaction (1) above and in FIG. 1. Thus, an alcohol 110 may be directed to the first reacting 220 so that the dicarboxylic acid 100 may be reacted with the alcohol 110 to produce the diester 120. The diester 120 may then be directed to a second reacting 230 step, where the diester 120 is polymerized with a diamine 140 to produce the target polymer 150, as shown above in Reaction (2) and Reaction (2) of FIG. 1.

Polymerization may be conducted in a top stirring batch reactor under reduced pressure. The polymerization reaction is autocatalytic. Initially, the reaction is heated so that all monomers are in their liquid phase. Following an initial polymerization period, the reaction is further heated to ensure that the polymer can be adequately stirred.

In some embodiments of the present disclosure, copolymers may be produced according to at least some of the methods described above, where the copolymer has the general structure,

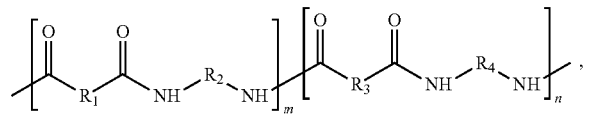

where the R groups between the —NH— groups are different; e.g. R$_2$ is not the same as R$_4$. Such copolymers may be produced using the methods and materials described above. For example, a first polymerization may be conducted where a first dicarboxylic acid (or diester, or acyl chloride) is reacted with a first diamine to produce a first mixture of oligomers and/or polymers containing a first repeat unit containing the R$_1$ and R$_2$ groups, with this first mixture of oligomers and/or polymers having an average of m first repeat units. Separately (e.g. in parallel, before, and/or after), a second polymerization may be conducted where a second dicarboxylic acid (or diester, or acyl chloride) is reacted with a second diamine to produce a second mixture of oligomers and/or polymers containing a second repeat unit containing the R$_3$ and R$_4$ groups, with this second mixture of oligomers and/or polymers having an average of n first repeat units. Then, at any point during after both mixtures have progressed to a predefined point (e.g. average chain length, molecular weight, etc.), at least a portion of the first mixture may be combined with at least a portion of the second mixture to create a copolymer having the general structure shown above.

EXPERIMENTAL EXAMPLES

Example 1

β-keto adipic acid (BKA) (also called 3-oxohexanedioic acid or 3-oxoadipic acid) a linear diacid, can be implemented directly into polymers for polyester or polyamide applications.

Separation of BKA and Preparation of Dimethyl-BK:

Due to the nature of BKA, the molecule can undergo spontaneous decarboxylation when subject to heat of when in solution for extended periods of time (a majority of the BKA will undergo decarboxylation in 6 hours in solution) (Scheme 1). In order to separate BKA from the fermentation broth, either liquid-liquid extraction or anionic columns are used. For both separation methods, the fermentation broth is initially treated with 4 g/L of activated carbon that is subsequently removed via filtration. In the case of liquid-liquid extraction, the broth is initially acidified to pH=2 and then extracted with an equal volume of ethyl acetate three times. The ethyl acetate was dried with sodium sulfate for ten minutes and then removed via rotovap at 35° C. The BKA was subsequently washed with cold acetone to remove any levulinic acid and stored in a freezer.

Scheme 1: Decarboxylation of BKA to levulinic acid. Methylated versions of BKA are thermally stable and do not undergo degradation

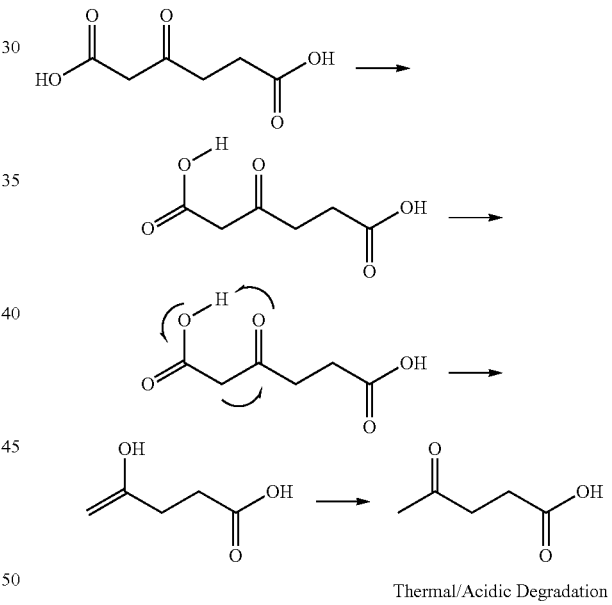

Thermal/Acidic Degradation

In order to methylate the BKA to hexanedioic acid, Steiglich esterification was implemented. Steiglich esterification was used due to the mild condition (room temperature, no excess acid) of the reaction. Initially, 5 g BKA was dissolved in dichloromethane (DCM) with 8 molar equivalents of methanol in a one necked round bottom flask while 2.1 molar equivalents of dicyclohexylcarbodimide (DCC) and 0.05 mol of 4-N,N'-dimethylaminopyridine (DMAP) was dissolved in a separate aliquot of DCM. The round bottom flask was placed in an ice bath and the DCC/DMAP/DCM mixture was added in drop-wise over the course of 30 minutes. Following the reaction, dicyclohexylurea (DHU, a byproduct of Steiglich esterification) was removed via filtration and the excess methanol and DCM was removed via rotovap. The remaining liquids and solids were placed into chilled DCM in a freezer over night to crash out any excess DHU. Once again, the DCM was removed via rotovap and preparative silica gel chromatography was implemented to isolate the hexanedioic acid. The hexanedioic acid has a purity of 99.9% as determined via Modulated Digital Scanning Calorimetry (MDSC).

The resultant hexanedioic acid was polymerized with hexamythldiamine (HMDA) to synthesize a nylon-like performance differentiated replacement for the commercially significant Nylon 6, 6. DMBKA and HMDA were loaded into a three-necked round bottom flask fitted with a nitrogen purge, mechanical stirring motor, and Dean-Stark/Condenser apparatus to condense methanol. The reaction mixture was heated to 70° C. for an initial transesterfication period of 2 hours. Subsequently, vacuum was pulled on the system and polymerization was allowed to occur for four (4) more hours. The solid was dissolved in m-creosol and subsequently cast onto glass plates. The glass plates were placed in a vacuum oven to remove all solvent and the polymers were subsequently characterized.

Thermal Characterization:

Polymers were characterized with a TA Instruments Q500 Digital Scanning Calorimeter (DSC) and Q5000 Thermal Gravimetric Analyzer (TGA). Heating scans via DSC were conducted at 10° C./min with all thermal properties being acquired from the second scan.

Molecular Weight Characterization:

Viscosity average molecular weight, $M_v$, was determined via dilute solution viscometry. An ubbelholde viscometer (Cole Parmer) was used with m-cresol as a solvent at 25 C and polymer solutions ranging in concentration from 0.005 g/mL and 0.02 g/mL. Fo these studies with m-cresol at 25 C, the Mark-Houwink parameters for Nylon 6,6 were used (a=0.61, K=0.0024 g/mol). Polymer properties are summarized in Table 1 below.

TABLE 1

| | Physical Properties (Temperatures in ° C.) | | |
|---|---|---|---|
| Starting Diacid/Diester | Glass Transition Temperature | Melting Temperature | $M_v$ *$10^{-4}$ (g/mol) |
| Beta-keto Adipate | 130 | 400* | 3.3 |
| Adipic Acid | 60 | 260 | 5.2 |

*The β-keto adipic acid polymer begins to degrade at about 400° C.

The synthesized polyamide has properties that are advantageous over that of polyamides synthesized from adipic acid. Specifically, the polyamides from BKA possess a higher glass transition temperature than their adipic acid counterpart (commercially Nylon 6,6). Both polymers posses a high glass transition temperature due to hydrogen bonding between the polymer chains, however, the BKA polymer possess a higher glass transition due to the ketone in the polymer backbone restricting polymer motion. This makes BKA suitable for nylons that can operate across a wider range of temperatures and can be used to modify existing nylon 6,6 to impart favorable properties (e.g. high moduli and lower permeabilities).

Additionally, the molecular weight of the final BKA polyamide (as determined via DSV) was found to be higher than that of Nylon 6,6. The Mark-Houwink parameters for Nylon 6,6 may not be exact for the BKA Nylon, but this preliminary data indicates that the BKA Nylon is more reactive than adipic acid.

Key Points:
The beta position of the ketone in BKA results in spontaneous decarboxylation of the molecule (converting BKA to levulinic acid) when heated or in solution
In order to polymerize BKA, it should be converted to an ester before polymerization
This work details a variety of attempts at synthesizing Dimethyl BKA
Due to the presence of the ketone in BKA's backbone, the resultant in polymers possess higher glass transition temperatures than polymers synthesized from adipic acid
BKA can and will be blended into nylon 6,6 and alter the properties of the overall polymer, thus not requiring all the homopolymer to be synthesized from BKA
Additionally, beta-keto adipate can be reacted with diols to form polyesters with higher glass transition temperatures than their adipic acid counter parts.
Poly(butylene BKA) (from BKA and Butanediol) can be blended with PET (from a recycling stream) to produce polymers with high $T_g$s that may be biodegradeable
While PBAT is considered a biodegradeable polyethylene replacement, this is a biodegradeable PET replacement.

Experimental Examples 2-5

Figure 3:
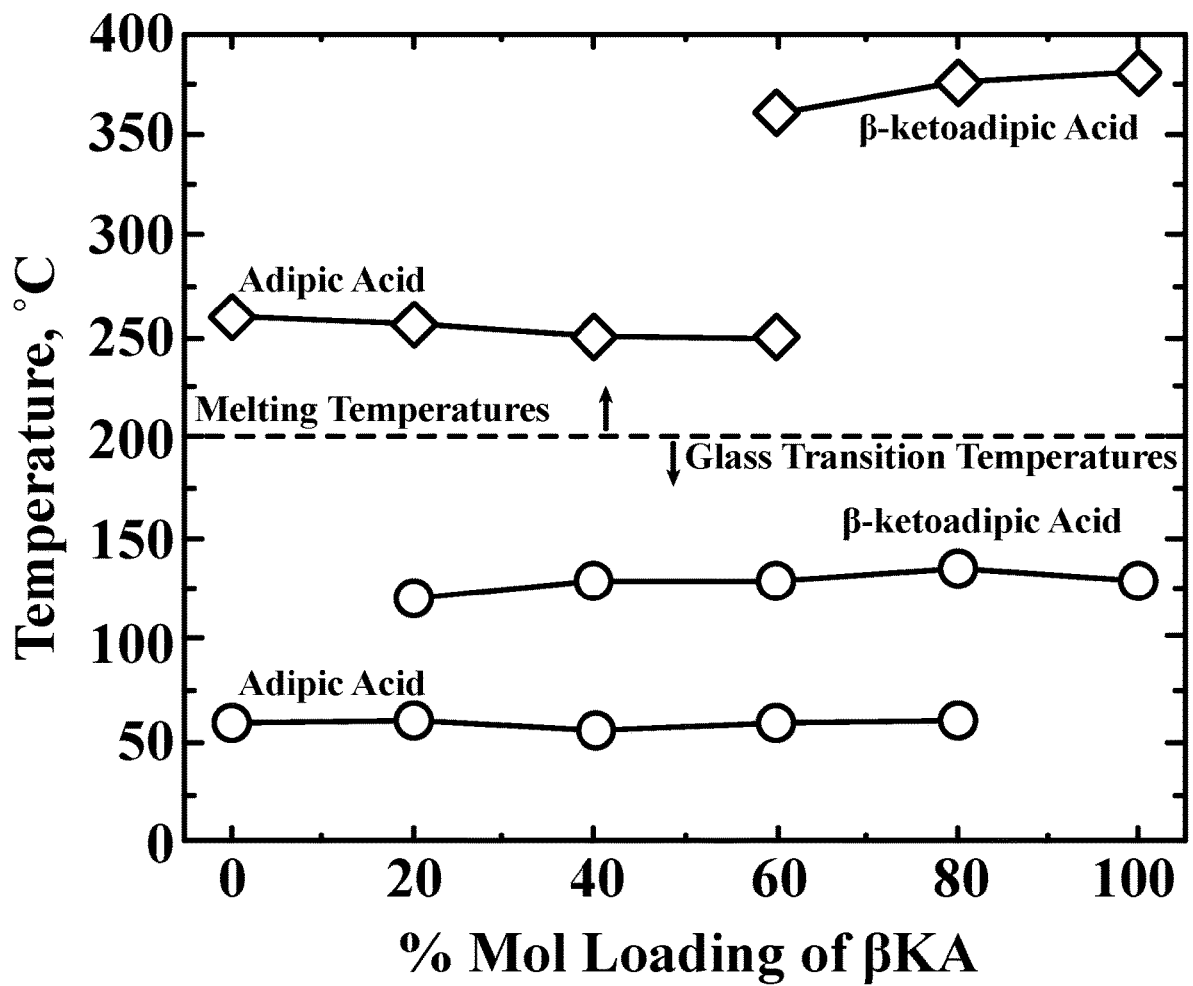
FIG. 3 illustrates $T_m$ (melting temperatures) and $T_g$ (glass transition temperatures) for homopolymers and/or copolymers made using adipic acid, β-keto adipic acid, and hexamethyl diamine, according to some embodiments of the present disclosure.
Figure 4:
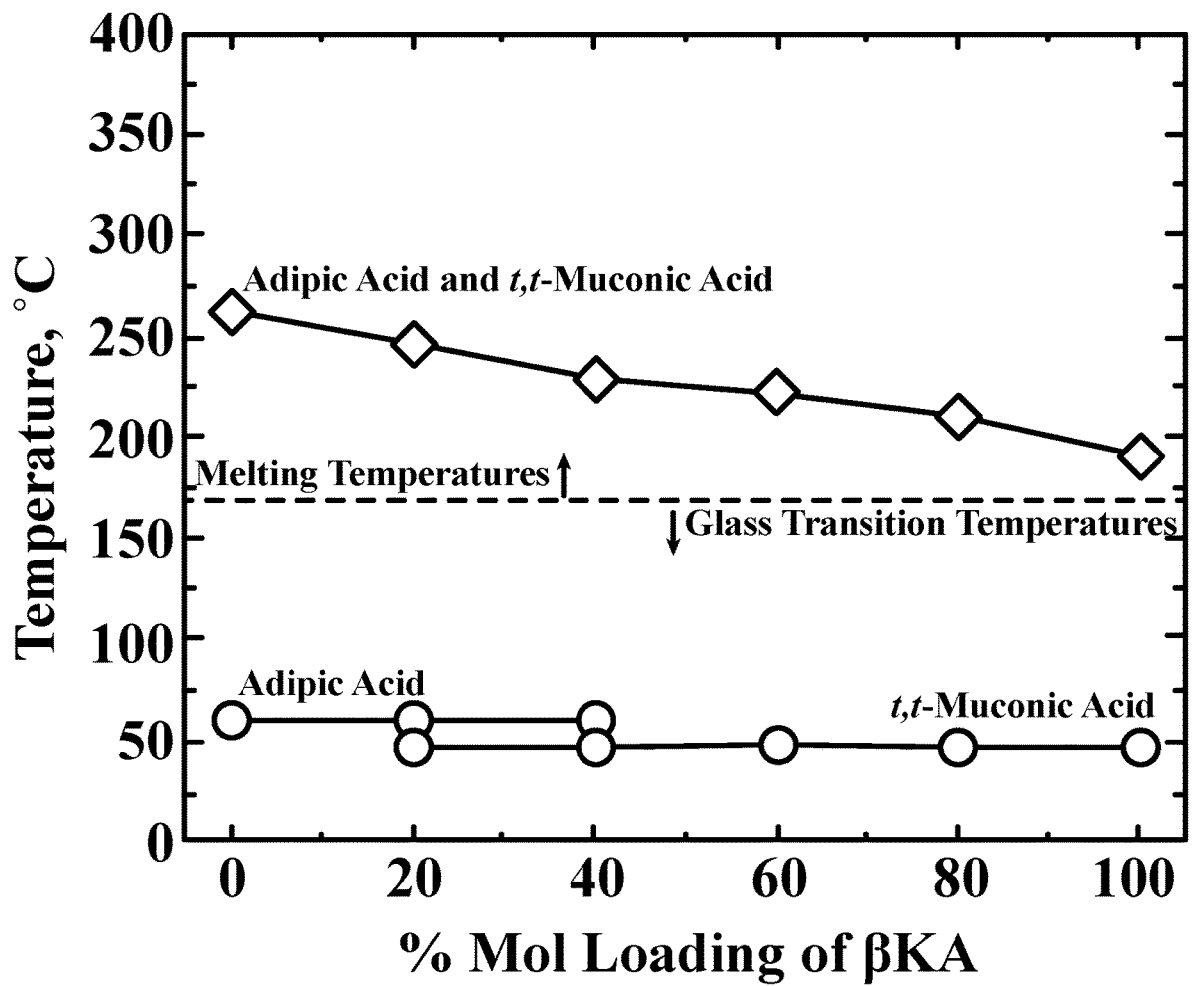
FIG. 4 illustrates $T_m$ and $T_g$ for homopolymers and/or copolymers made using adipic acid, muconic acid, and hexamethyl diamine, according to some embodiments of the present disclosure.
Figure 5:
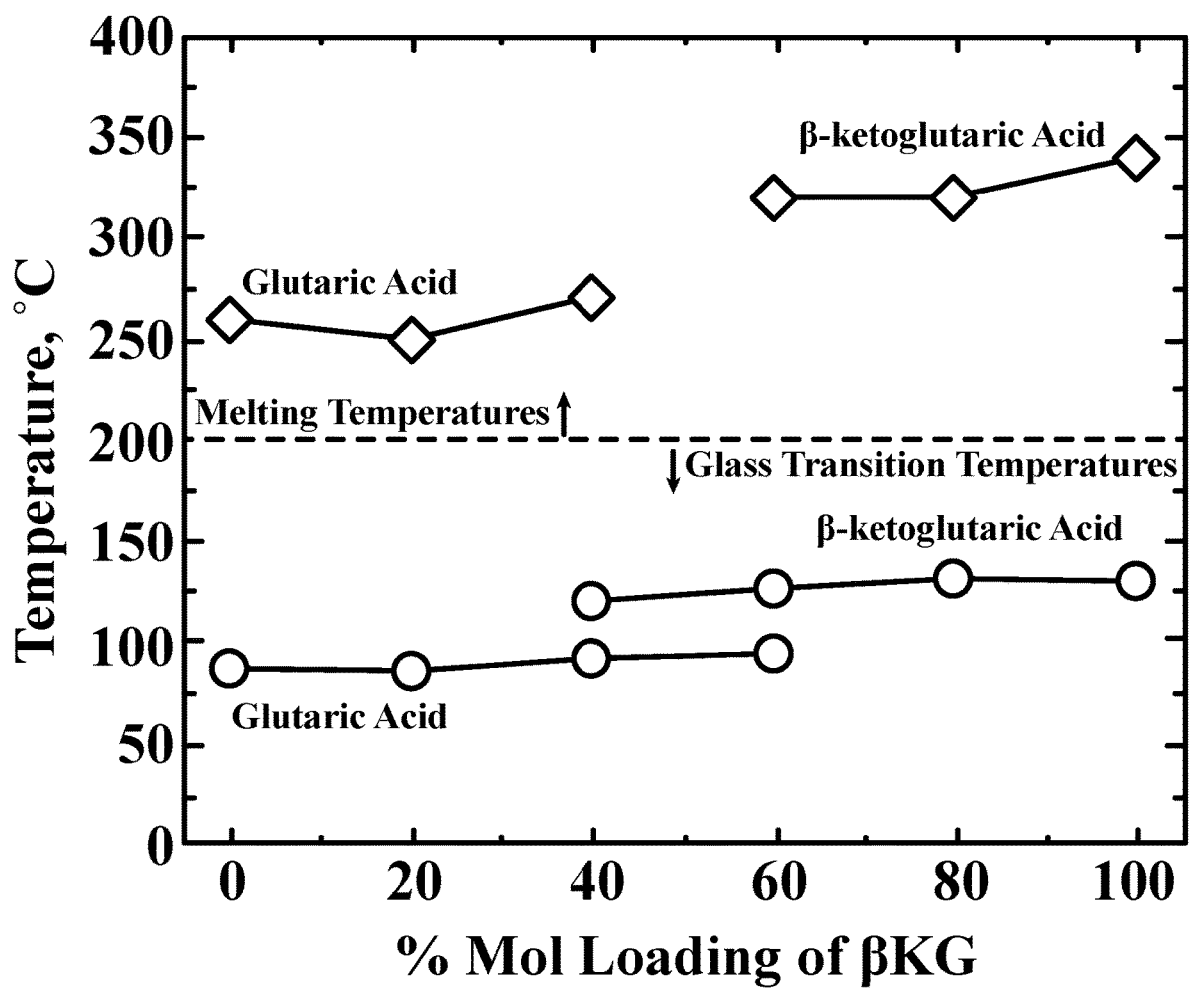
FIG. 5 illustrates $T_m$ and $T_g$ for homopolymers and/or copolymers made using glutaric acid, β-keto glutaric acid, and hexamethyl diamine, according to some embodiments of the present disclosure.
Figure 6:
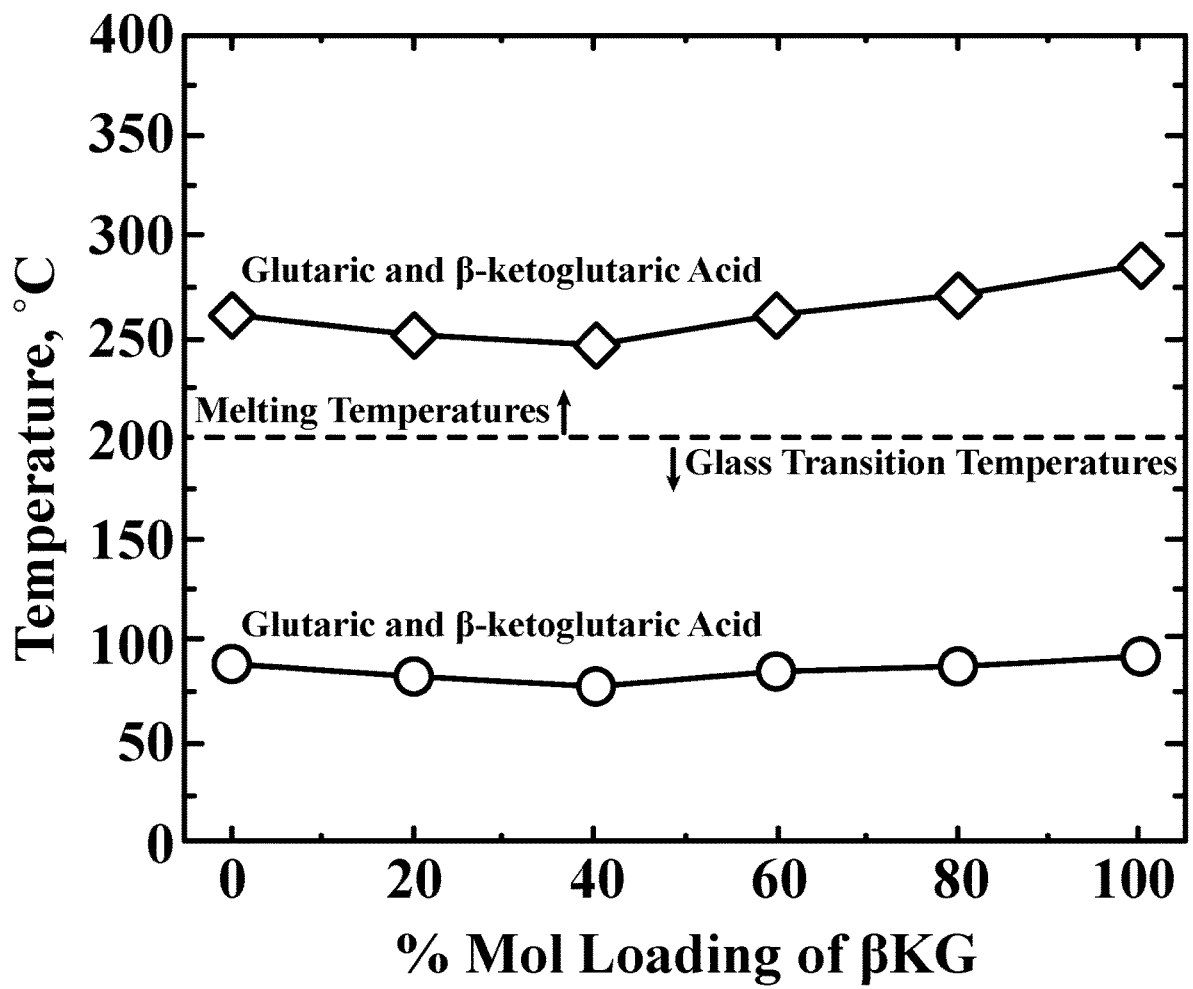
FIG. 6 illustrates $T_m$ and $T_g$ for homopolymers and/or copolymers made using glutaric acid, α-keto glutaric acid, and hexamethyl diamine, according to some embodiments of the present disclosure.

For each of the following examples, each of the three synthesis routes described above were tested; e.g. Reactions (1) and (2) for Route #1 (esterification/polymerization); Reaction (3) for Route #2 (condensation/polymerization); and Reactions (4) and (5) for Route #3 (acylation/polymerization). The specific reaction conditions for each of these reactions are provide below, followed by the experimental results obtained for each of the following systems, using the three reaction routes:

Example 2): homopolymers and copolymers made using adipic acid, β-keto adipic acid, and hexamethyl diamine (see FIG. 3);

Example 3): homopolymers and copolymers made using adipic acid, muconic acid, and hexamethyl diamine (see FIG. 4);

Example 4): homopolymers and copolymers made using glutaric acid, β-keto glutaric acid, and hexamethyl diamine (see FIG. 5); and Example 5): homopolymers and copolymers made using glutaric acid, α-keto glutaric acid, and hexamethyl diamine (see FIG. 6).

Reaction (1)/Route #1 (esterification/polymerization): For each example, Steiglich esterification was implemented at room temperature with stoichiometric amounts of dicarboxylic acid to convert the dicarboxylic acids to diesters. Initially, each dicarboxylic acid (e.g. β-keto adipic acid) was dissolved in dichloromethane (DCM) with 8 molar equivalents of methanol (e.g. the alcohol for the esterification) in a one necked round bottom flask while 2.1 molar equivalents of dicyclohexylcarbodimide (DCC) and 0.05 mol of 4-N, N'-dimethylaminopyridine (DMAP) was dissolved in a separate aliquot of DCM. The round bottom flask was placed in an ice bath and the DCC/DMAP/DCM mixture was added drop-wise over the course of 30 minutes. Following the reaction, dicyclohexylurea (DHU, a byproduct) was removed via filtration and the excess methanol and DCM was removed by distisllation (e.g. rotovap). The remaining liquids and solids were placed into chilled DCM in a freezer over night to precipitate any excess DHU. Once again, the DCM was removed by distillation and preparative silica gel chromatography was implemented to isolate the diester products (e.g. dimethyl β-keto adipic acid). Typical diester purities approached up to 99.9%, as determined via Modulated Digital Scanning Calorimetry (MDSC) Reaction (2)/ Route #1 (esterification/polymerization): For each example, pairs of diesters produced from Reaction (1) were polymerized with hexamythldiamine (HMDA). In each case, homopolymers of each diester were produced, as well as copolymers, by varying 0≤x≤1.0 as described above. For each case, the diester(s) and HMDA were loaded, in equimolar ratios, into a three-necked round bottom flask fitted with a nitrogen purge, mechanical stirring motor, and Dean-Stark/Condenser apparatus to condense methanol. Each reaction mixture was heated to 70° C. for an initial period of 2 hours. Subsequently, vacuum was pulled on the system and polymerization was allowed to occur for four (4) more hours. The resultant solid polymer products (e.g. homopolymers and copolymers) were dissolved in m-creosol and subsequently cast onto glass plates. The glass plates were placed in a vacuum oven to remove all solvent and the polymers were subsequently characterized.

Reaction (3)/Route #2 (condensation/polymerization): For each example, a dicarboxylic acid, or dicarboxylic acid pair, was polymerized with hexamythldiamine (HMDA, where the relative amounts of each dicarboxylic acid was varied by 0≤x≤1.0. The dicarboxylic acid(s) and HMDA were loaded, in equimolar ratios, into a three-necked round bottom flask fitted with a nitrogen purge, mechanical stirring motor, and Dean-Stark/Condenser apparatus. Each reaction mixture was heated to 70° C. for an initial period of 2 hours. Subsequently, vacuum was pulled on the system and polymerization was allowed to occur for four (4) more hours. The resultant polymer solid (e.g. homopolymers and copolymers) were dissolved in m-creosol and subsequently cast onto glass plates. The glass plates were placed in a vacuum oven to remove all solvent and the polymers were subsequently characterized.

Reaction (4)/Route #3 (acylation/polymerization): For each example, each dicarboxylic acid was converted an acyl chloride by dissolving the dicarboxylic acid in dichloromethane and reacting it with phosphorous oxychloride. The resultant products, the acyl chlorides, precipitated out of the solution and were recovered by filtration.

Reaction (5)/Route #3 (acylation/polymerization): The acryl chlorides, and acyl chloride pairs, resulting from Reaction (4) were polymerized with hexamythldiamine (HMDA) to synthesize both homopolymers of each acyl chloride, as well as homopolymers by varying 0≤x≤1.0. The acyl chloride(s) and HMDA were loaded, in equimolar ratios, into a three-necked round bottom flask fitted with a nitrogen purge, mechanical stirring motor, and Dean-Stark/Condenser apparatus (filled with water to collect the released HC1). Each reaction mixture was heated to 70° C. for an initial period of 2 hours. Subsequently, vacuum was pulled on the system and polymerization was allowed to occur for four (4) more hours. The resultant polymer solids (e.g. homopolymers and copolymers) were dissolved in m-creosol and subsequently cast onto glass plates. The glass plates were placed in a vacuum oven to remove all solvent and the resultant polymers were subsequently characterized.

Experimental Example 2

FIG. 3 illustrates $T_m$ (melting temperatures) and $T_g$ (glass transition temperatures) for homopolymers and copolymers made using adipic acid, β-keto adipic acid, and hexamethyl diamine, according to some embodiments of the present disclosure. The two regimes of glass transition temperatures, and melting temperatures, suggests different polymer regimes. For example, the higher of the two melting temperature regions may be due to ketone-ketone interactions and the higher glass transition temperatures may be due to segmental dynamic limitations resulting from multiple carbon constraints.

Experimental Example 3

FIG. 4 illustrates $T_m$ and $T_g$ for homopolymers and copolymers made using adipic acid, muconic acid, and hexamethyl diamine, according to some embodiments of the present disclosure.

Experimental Example 4

FIG. 5 illustrates $T_m$ and $T_g$ for homopolymers and copolymers made using glutaric acid, β-keto glutaric acid, and hexamethyl diamine, according to some embodiments of the present disclosure.

Experimental Example 5

FIG. 6 illustrates $T_m$ and $T_g$ for homopolymers and copolymers made using glutaric acid, α-keto glutaric acid, and hexamethyl diamine, according to some embodiments of the present disclosure.

EXAMPLES

Example 1

A polymer comprising: a first repeat unit having the structure

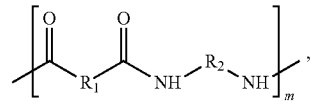

wherein: m is between 1 and 1,000, $R_1$ comprises a first organic group, and $R_2$ comprises a second organic group.

Example 2

The polymer of Example 1, wherein the first repeat unit comprises at least one of

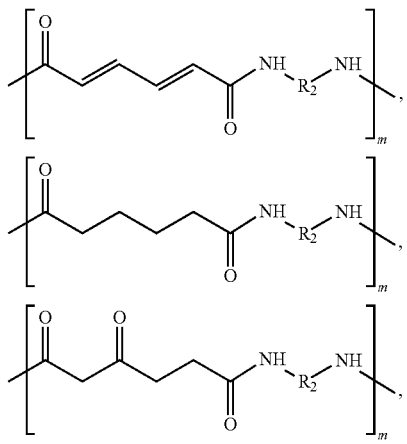

-continued

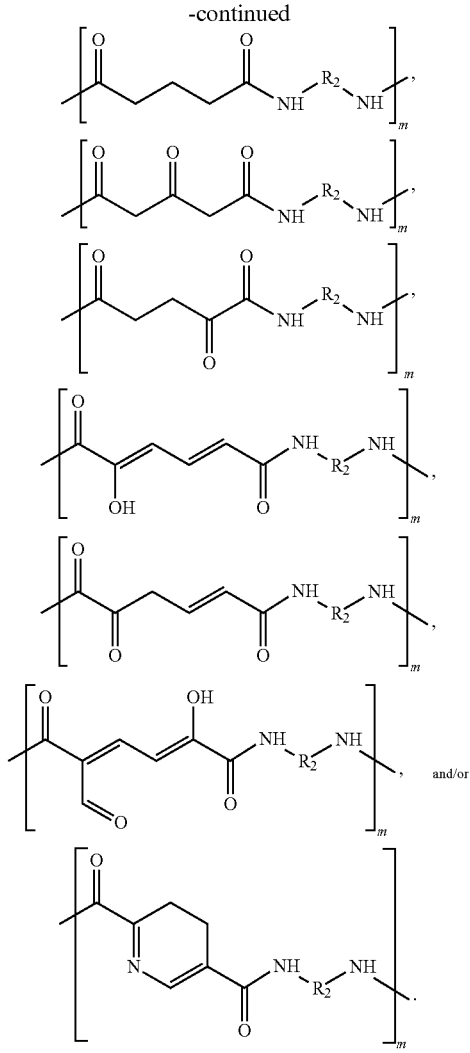

Example 3

The polymer of Example 2, wherein the first repeat unit comprises at least one of

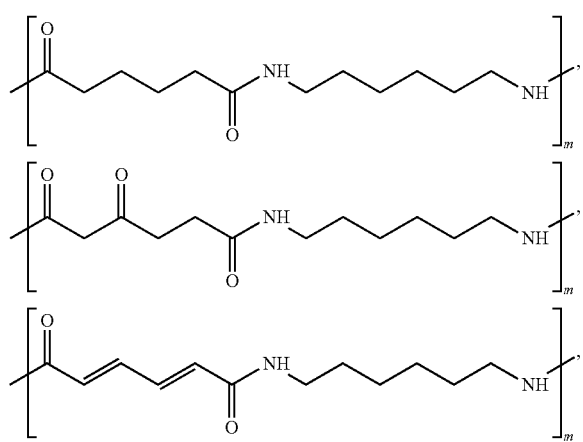

-continued

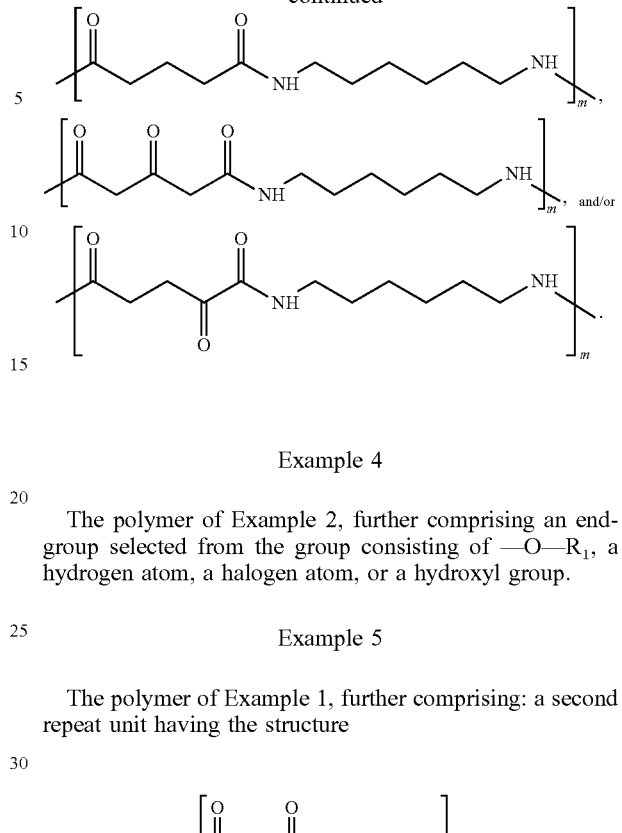

Example 4

The polymer of Example 2, further comprising an end-group selected from the group consisting of —O—R$_1$, a hydrogen atom, a halogen atom, or a hydroxyl group.

Example 5

The polymer of Example 1, further comprising: a second repeat unit having the structure

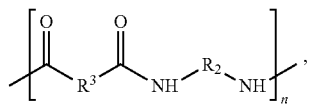

wherein: n is between 1 and 1,000, and R$_3$ comprises a third organic group.

Example 6

The polymer of Example 5, wherein: the polymer has the structure

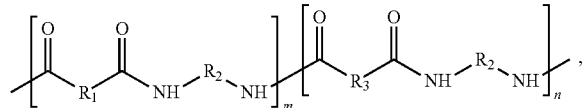

and R$_1$ is different than R$_3$.

Example 7

The polymer of Example 5, wherein the second repeat unit comprises at least one of

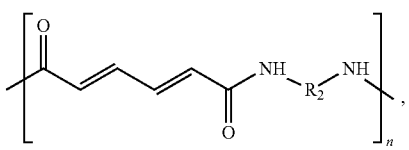

-continued
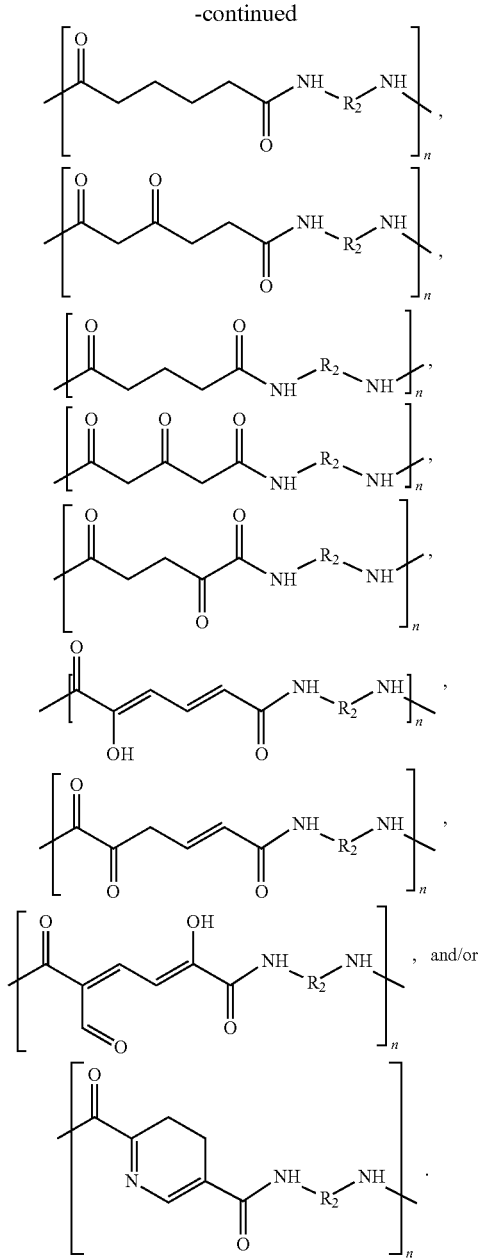
Example 8
The polymer of Example 7, wherein the second repeat unit comprises at least one of
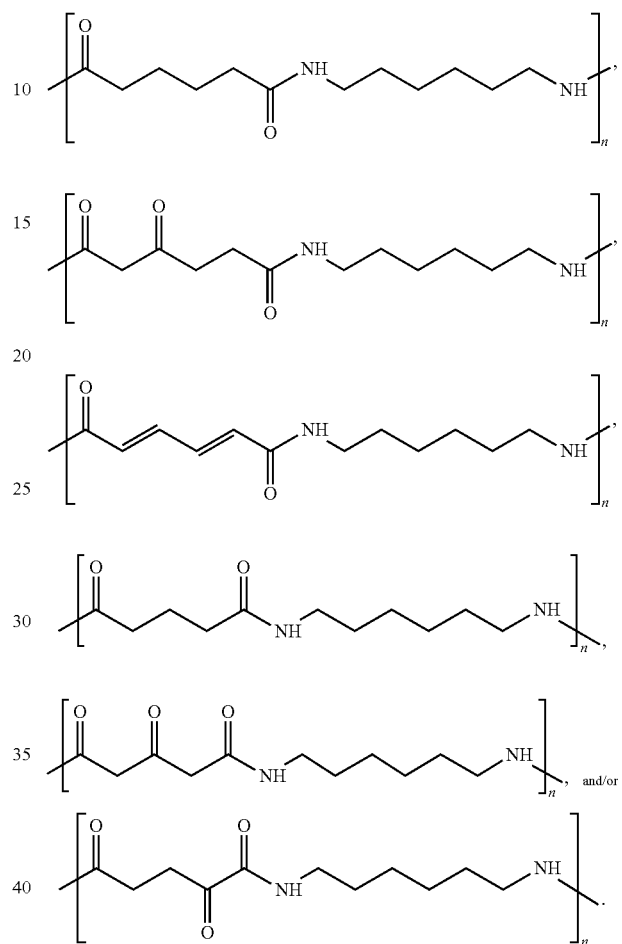
Example 9
The polymer of Example 8, wherein the polymer comprises at least one of
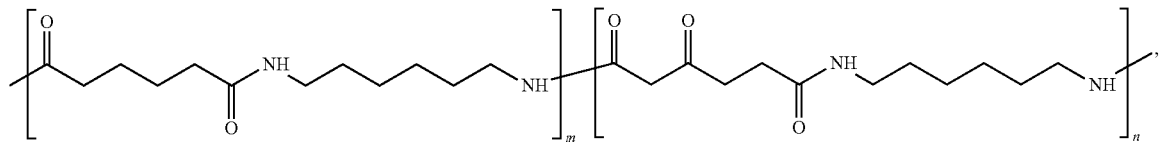
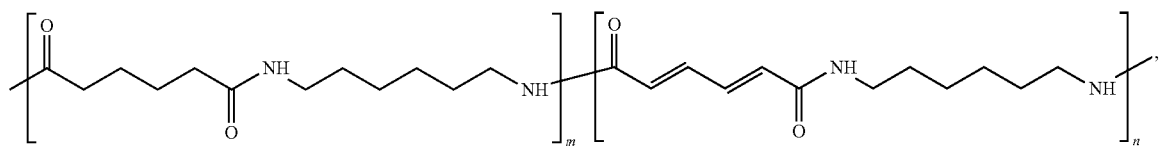

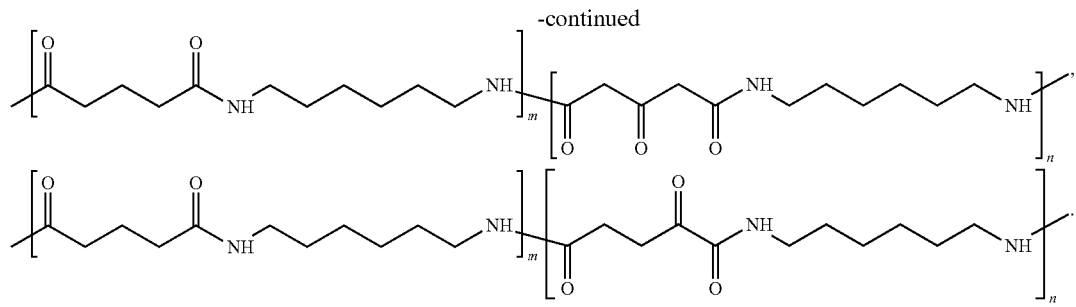

Example 10

The polymer of Example 1, wherein $R_1$ comprises at least one of an alkane group, an alkene group, or an alkyne group.

Example 11

The polymer of Example 10, wherein $R_1$ is either branched or a straight chain.

Example 12

The polymer of Example 11, wherein $R_1$ further comprises at least one of nitrogen, oxygen, sulfur, or a halogen.

Example 13

The polymer of Example 12, wherein $R_1$ further comprises at least one of an amine group, an aldehyde group, a ketone group, an acyl chloride group, a halogen group, a carboxylic acid group, an ester group, or an amide group.

Example 14

The polymer of Example 1, wherein $R_2$ comprises at least one of an alkane group, an alkene group, or an alkyne group.

Example 15

The polymer of Example 14, wherein $R_2$ is either branched or a straight chain.

Example 16

The polymer of Example 15, wherein $R_2$ further comprises at least one of nitrogen, oxygen, sulfur, or a halogen.

Example 17

The polymer of Example 16, wherein $R_2$ further comprises at least one of an amine group, an aldehyde group, a ketone group, an acyl chloride group, a halogen group, a carboxylic acid group, an ester group, or an amide group.

Example 18

The polymer of Example 5, wherein $R_3$ comprises at least one of an alkane, an alkene, or an alkyne.

Example 19

The polymer of Example 18, wherein $R_3$ is either branched or a straight chain.

Example 20

The polymer of Example 19, wherein $R_3$ further comprises at least one of nitrogen, oxygen, sulfur, or a halogen.

Example 21

The polymer of Example 20, wherein $R_3$ further comprises at least one of an amine group, an aldehyde group, a ketone group, an acyl chloride group, a halogen group, a carboxylic acid group, an ester group, or an amide group.

Example 22

The polymer of Example 5, wherein $R_2$ of the first repeat unit is different than $R_2$ of the second repeat unit.

Example 23

A method comprising: polymerizing a diamine with a first reactant having the structure

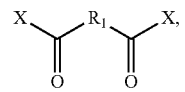

wherein: $R_1$ comprises a first organic, X comprises at least one of —O—$R_4$, a hydroxyl group, or a halogen, $R_4$ comprises at least one of an alkane group, an alkene group, or an alkyne group, the polymerizing results in a polymer having a first repeat unit with the structure

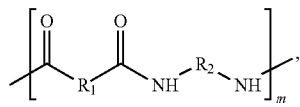

and m is between 1 and 1,000.

Example 24

The method of Example 23, wherein: X comprises a hydroxyl group, and the polymerizing produces water.

Example 25

The method of Example 23, wherein: X comprises —O—$R_4$, $R_4$ comprises an alkane, and the polymerizing produces an alcohol.

Example 26

The method of Example 25, further comprising, prior to the polymerizing, reacting a first carboxylic acid with the alcohol to produce the first reactant and water.

Example 27

The method of Example 23, wherein: X comprises chloride, and the polymerizing produces HCl.

Example 28

The method of Example 27, further comprising, prior to the polymerizing, reacting a first carboxylic acid with phosphorous oxychloride to produce the first reactant.

Example 29

The method of Example 23, wherein: the polymerizing further comprises a second reactant having the structure

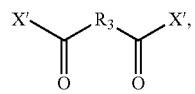

wherein: $R_3$ comprises a second organic, X' comprises at least one of —O—$R_5$, a hydroxyl group, or a halogen, $R_5$ comprises at least one of an alkane group, an alkene group, or an alkyne group, the polymerizing results in a polymer having a second repeat unit with the structure

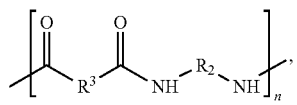

and n is between 1 and 1,000.

Example 30

The method of Example 29, wherein X' comprises a hydroxyl group and the polymerizing produces water.

Example 31

The method of Example 29, wherein: X' comprises —O—$R_5$, $R_5$ comprises an alkane, and the polymerizing produces an alcohol.

Example 32

The method of Example 31, further comprising, prior to the polymerizing, reacting a second carboxylic acid with the alcohol to produce the second reactant and water.

Example 33

The method of Example 29, wherein: X' comprises chloride, and the polymerizing produces HCl.

Example 34

The method of Example 33, further comprising, prior to the polymerizing, reacting a second carboxylic acid with phosphorous oxychloride to produce the second reactant.

Example 35

The method of Example 29, wherein: X comprises a hydroxyl group, X' comprises a hydroxyl group, and the polymerizing produces water.

Example 36

The method of Example 29, wherein: X comprises —O—$R_4$, $R_4$ comprises an alkane, X' comprises —O—$R_5$, $R_5$ comprises an alkane, and the polymerizing produces an alcohol.

Example 37

The method of Example 36, further comprising, prior to the polymerizing: reacting a first carboxylic acid with the alcohol to produce the first reactant; and reacting a second carboxylic acid with the alcohol to produce the second reactant.

Example 38

The method of Example 29, wherein: X comprises chloride, X' comprises chloride, and the polymerizing produces HCl.

Example 39

The method of Example 38, further comprising, prior to the polymerizing: reacting a first carboxylic acid with phosphorous oxychloride to produce the first reactant; and reacting a second carboxylic acid with phosphorous oxychloride to produce the second reactant.

Example 40

The method of Example 29, wherein: the polymerizing produces a polymer having the structure

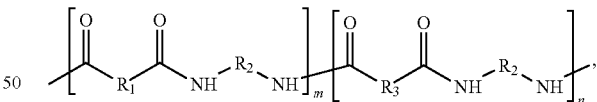

and $R_1$ is different than $R_3$.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A polymer comprising:
a first repeat unit having the structure

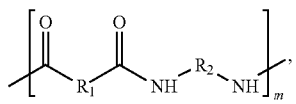

wherein:
m is between 1 and 1,000,
$R_1$ comprises a first organic group that is saturated and amine-free, and
$R_2$ comprises a second organic group.

2. The polymer of claim 1, wherein the first repeat unit comprises at least one of

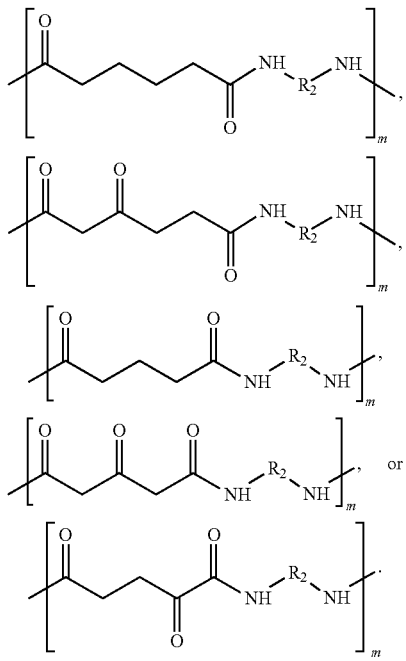

3. The polymer of claim 2, wherein the first repeat unit comprises at least one of

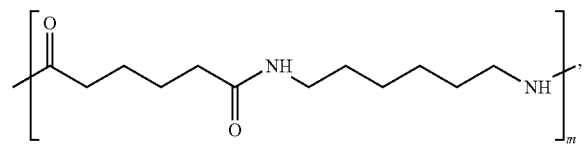

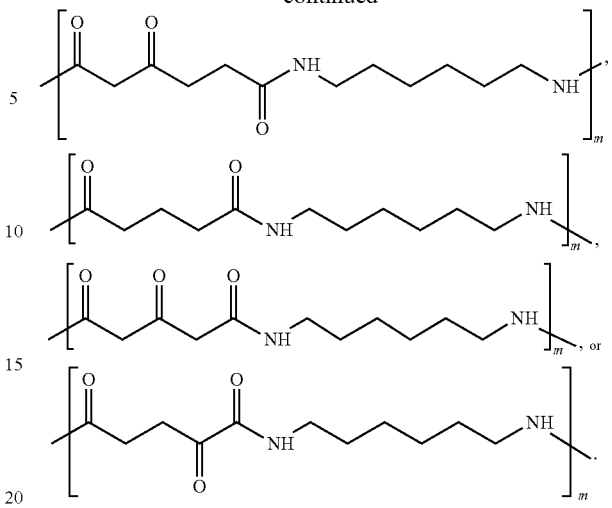

4. The polymer of claim 2, further comprising an end-group selected from the group consisting of —O—$R_1$, a hydrogen atom, a halogen atom, or a hydroxyl group.

5. The polymer of claim 1, further comprising:
a second repeat unit having the structure

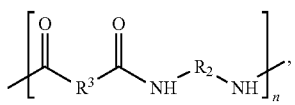

wherein:
n is between 1 and 1,000, and
$R_3$ comprises a third organic group.

6. The polymer of claim 5, wherein:
the polymer has the structure

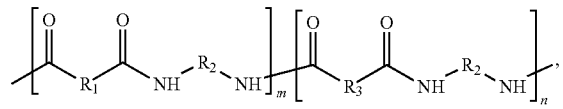

and
$R_1$ is different than $R_3$.

7. The polymer of claim 5, wherein the second repeat unit comprises at least one of

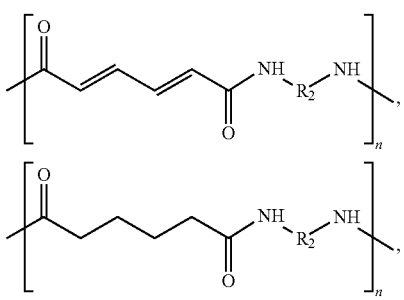

-continued
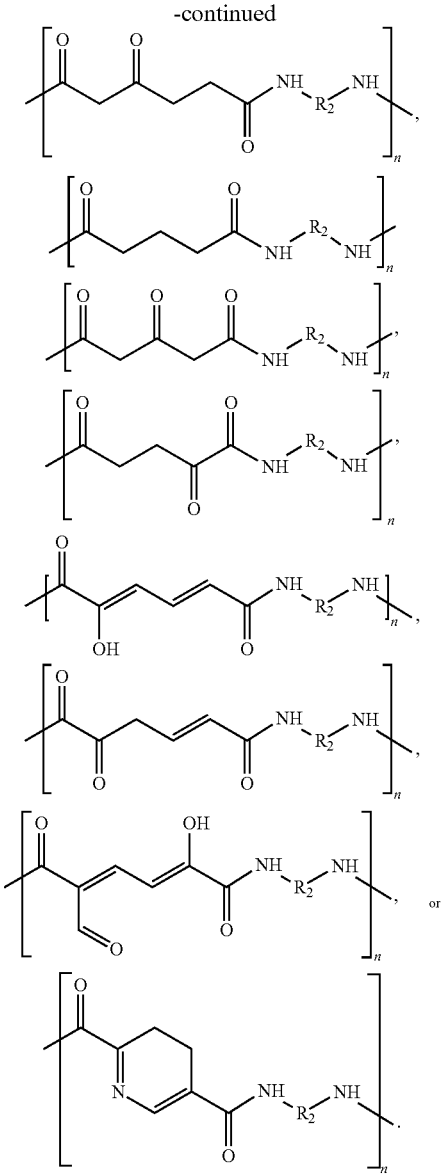
8. The polymer of claim 7, wherein the second repeat unit comprises at least one of
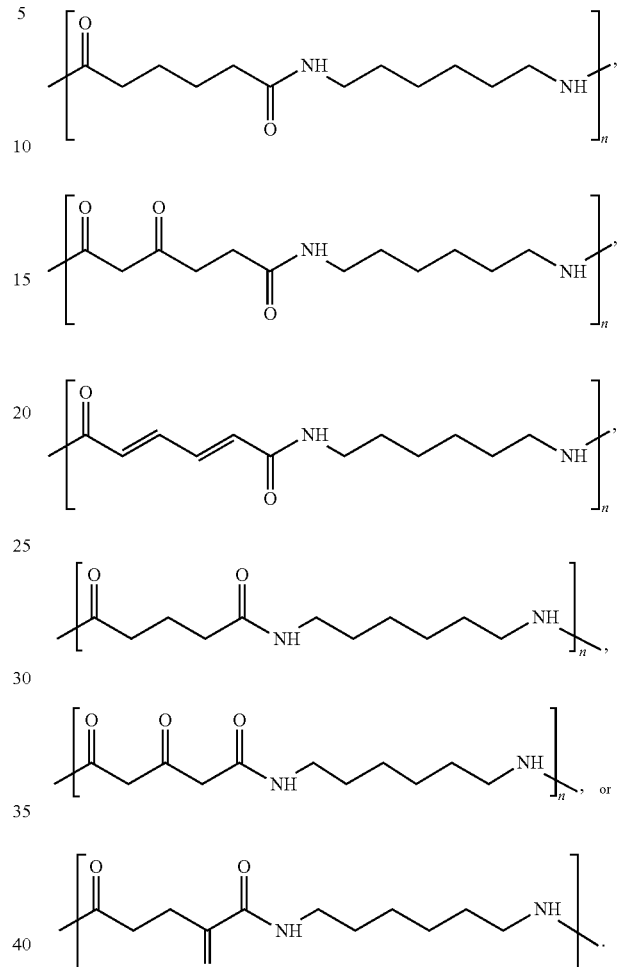
9. The polymer of claim 8, wherein the polymer comprises at least one of
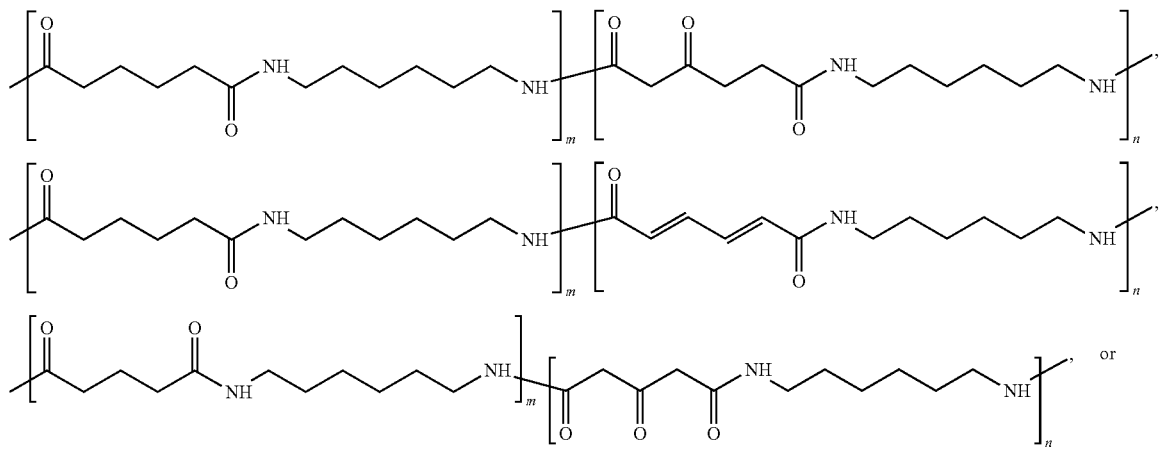

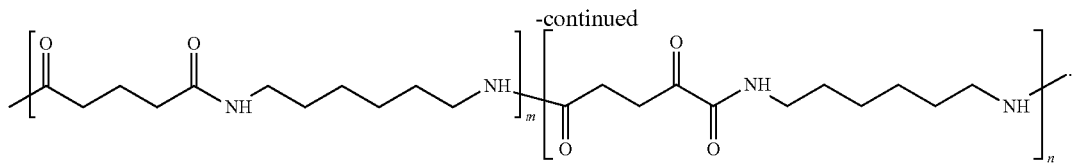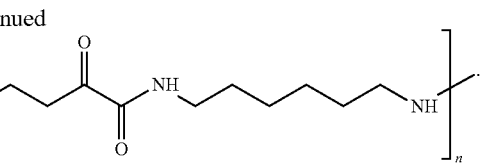

10. The polymer of claim 5, wherein $R_2$ of the first repeat unit is different than $R_2$ of the second repeat unit.

11. A method comprising:
   polymerizing a diamine with a first reactant having the structure

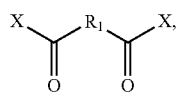

wherein:
   $R_1$ comprises a first organic that is saturated and amine-free,
   X comprises at least one of —O—$R_4$, a hydroxyl group, or a halogen,
   $R_4$ comprises at least one of an alkane group, an alkene group, or an alkyne group,
   the polymerizing results in a polymer having a first repeat unit with the structure

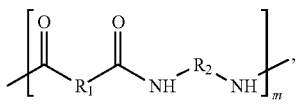

$R_2$ comprises a second organic group, and
   m is between 1 and 1,000.

12. The method of claim 11, wherein:
   X comprises a hydroxyl group, and
   the polymerizing produces water.

13. The method of claim 11, wherein:
   X comprises —O—$R_4$,
   $R_4$ comprises an alkane, and
   the polymerizing produces an alcohol.

14. The method of claim 13, further comprising, prior to the polymerizing, reacting a first carboxylic acid with the alcohol to produce the first reactant and water.

15. The method of claim 11, wherein:
   X comprises chloride, and
   the polymerizing produces HCl.

16. The method of claim 15, further comprising, prior to the polymerizing, reacting a first carboxylic acid with phosphorous oxychloride to produce the first reactant.

17. The method of claim 11, wherein:
   the polymerizing further comprises a second reactant having the structure

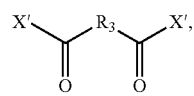

wherein:
   $R_3$ comprises a second organic,
   X' comprises at least one of —O—$R_5$, a hydroxyl group, or a halogen,
   $R_5$ comprises at least one of an alkane group, an alkene group, or an alkyne group,
   the polymerizing results in a polymer having a second repeat unit with the structure

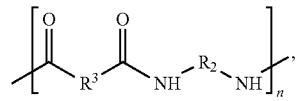

and
   n is between 1 and 1,000.

18. The method of claim 17, wherein:
   the polymerizing produces a polymer having the structure

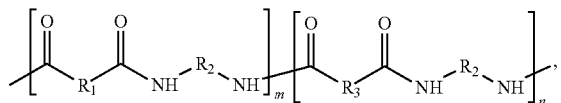

and
   $R_1$ is different than $R_3$.

* * * * *